United States Patent [19]

Hepworth

[11] 4,157,363

[45] Jun. 5, 1979

[54] RUBBER COMPOSITION

[75] Inventor: Paul Hepworth, Middlesbrough, England

[73] Assignee: Imperial Chemical Industries Limited, London, England

[21] Appl. No.: 710,881

[22] Filed: Aug. 2, 1976

[30] Foreign Application Priority Data

Aug. 20, 1975 [GB] United Kingdom ............... 34592/75
Apr. 20, 1976 [GB] United Kingdom ............... 15882/76

[51] Int. Cl.$^2$ ........................ C08L 7/00; C09L 23/18
[52] U.S. Cl. ........................................ 260/889; 260/5; 260/876 B; 260/889; 260/894; 526/237; 526/283; 526/290
[58] Field of Search ................... 260/5, 887, 888, 889, 260/894, 890, 876 B

[56] References Cited

U.S. PATENT DOCUMENTS 3,784,530 1/1974 Osborn et al. ..................... 260/894
3,963,653 7/1976 Katayama et al. .................. 260/890

Primary Examiner—J. Ziegler
Attorney, Agent, or Firm—Cushman, Darby & Cushman

[57] ABSTRACT

A composition comprising a rubber and a resin in which the resin has been produced by the copolymerization of a $C_5$ hydrocarbon stream and a butene, said $C_5$ hydrocarbon stream containing at least 10% by weight, based on the combined amounts of said $C_5$ hydrocarbon stream and butene, of dicyclopentadiene or a codimer of cyclopentadiene with a diene selected from the group consisting of butadiene, isoprene and piperylene; said $C_5$ hydrocarbon stream containing not more than 10% by weight of 2-methylbutene-2; and said resin having a molecular weight of 500 to 40,000 and containing 10 to 90% by weight butene.

10 Claims, 1 Drawing Figure

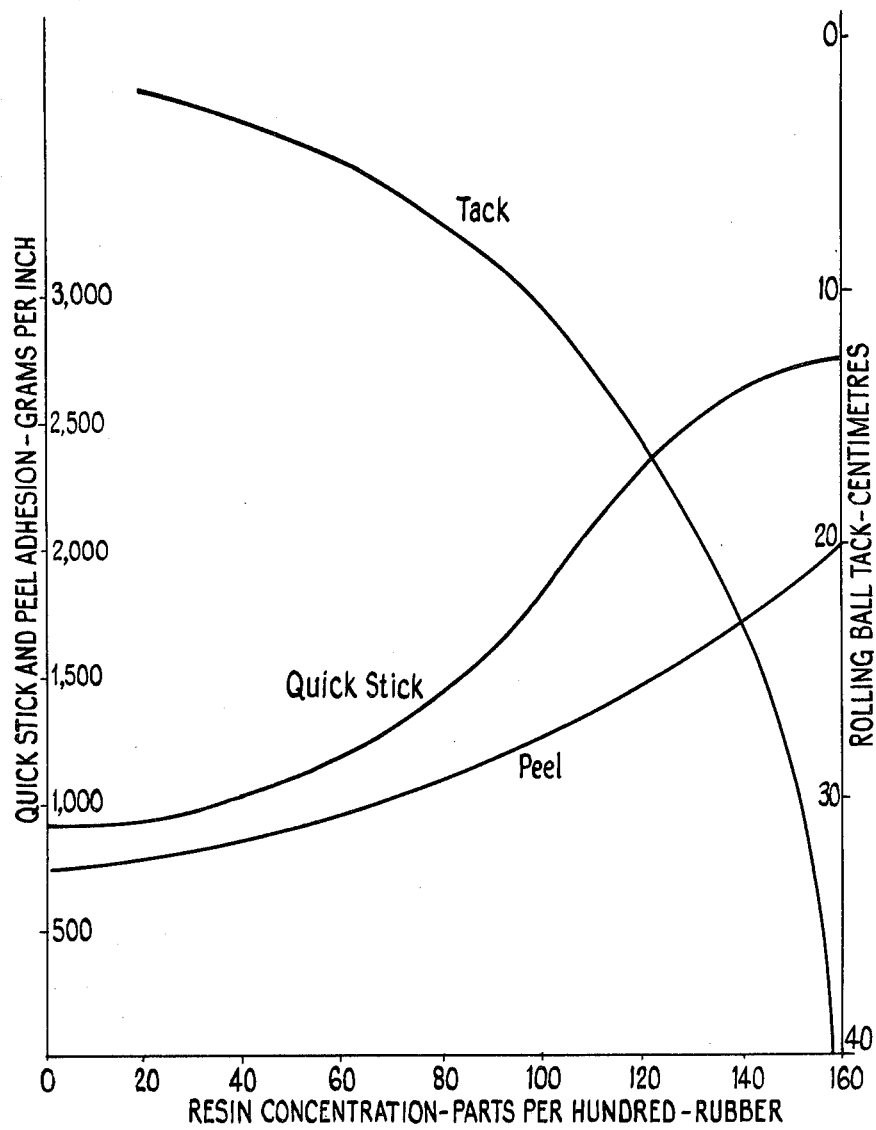

RUBBER COMPOSITION

The present invention relates to rubber compositions, in particular to rubber compositions showing improved tack.

"Tack" is the property of a rubber which causes rubber surfaces to adhere when pressed together and it enables articles such as tyres to be built up from rubber strips and surfaces coated with a rubber based impact adhesive to stick together. If a rubber lacks tack then laminated or spliced surfaces do not flow and knit together easily. Lack of tack is most pronounced in certain synthetic rubbers and requires treatment or addition of additives before the rubber is suitable for use.

According to the present invention a composition possessing improved tack comprises a rubber and a resin in which the resin has been produced by the copolymerisation of a $C_5$ hydrocarbon stream and a butene.

The butene is preferably isobutene but may suitably be a mixture of butenes such as is obtained in the petrochemical industry from hydrocarbon cracking operations. Such a butene mixture may contain, for example, 20 wt. % butene-1, 20 wt. % butene-2, 50 wt. % isobutene and a trace of inert butane.

The $C_5$ hydrocarbon stream is also a product of hydrocarbon cracking operations, a suitable cracker feedstock being naphtha (boiling range 32° to 205° C.) although other petroleum fractions such as kerosine (boiling range 205° to 260° C.) and light or heavy gas oil (boiling range 205° to 315° C. and 315° to 430° C. respectively) may also be used. The hydrocarbon feedstock is preferably cracked in the presence of steam. The $C_5$ stream as produced typically boils in the range 10° to 80° C. however the final boiling point may subsequently rise owing to the formation of dimers such as dicyclopentadiene. It may generally contain most of the following hydrocarbons: isoprene, cis- and trans-piperylene, n-pentane, isopentane, cyclopentane, cyclopentadiene, dicyclopentadiene and small amounts (i.e. not more than 10 weight % of each) of pentene-1, trans-pentene-2, 2-methylbutene-1, 3-methylbutene-1, 2-methylbutene-2, cyclopentene, and benzene. If desired this $C_5$ stream may be further refined before being used in the process of the present invention, e.g. the isoprene may be removed by distillation.

The $C_5$ stream, before or after the addition of the butene, may be heated to a temperature of at least 100° C., preferably to a temperature in the range 100° to 150° C., so as to dimerise any monocyclopentadiene which may be present. The presence of the monomer tends to produce unusable gelatinous resins. It is however desirable for the $C_5$ stream to contain dicyclopentadiene particularly at least 5 weight % preferably at least 10 weight % e.g. 10 to 30 weight % of the total $C_5$ and butene. Alternatively the dicyclopentadiene may be replaced partly or totally by a dimer of cyclopentadiene with another conjugated diolefine such as butadiene, isoprene or piperylene. Such "heterodimers" may be produced by reacting the $C_5$ stream containing the relevant conjugated diolefins and with or without the butene to a temperature of at least 160° C. (see our British Pat. No. 1,360,389).

The $C_5$ stream and butene are copolymerised by means of a catalyst to produce the resin. Friedel Crafts catalysts are suitable, e.g. inorganic halides and inorganic strong acids. Inorganic halides are generally preferred and include halides of aluminium, iron, tin, boron, zinc, antimony and titanium which may be used in conjunction with a hydrogen halide such as hydrogen chloride. For example, treatment with aluminium chloride, preferably complexed with hydrogen chloride in an aromatic solvent such as toluene or a xylene, produces a solution from which the resin may be recovered. Preferably, however, the Friedel Crafts catalyst is used in an aromatic solvent which is a benzene which is liquid at the temperature of the polymerisation and which is substituted by at least one secondary or tertiary alkyl group or by a cycloalkyl group, e.g. tert.butyl benzene, p-cymene, p-isobutyl toluene, p-ethyl-tert.amyl benzene, or in particular, cumene. Such catalysts are described in our Belgian Pat. No. 779,454, a complex of aluminium chloride, cumene and hydrogen chloride being preferred. The polymerisation of the $C_5$ feedstock is preferably carried out at a temperature of −100° C. to +200° C. under atmospheric pressure and the catalyst is finally broken down and removed from the polymer by treatment, for example, with alcoholic ammonia or aqueous alkali or by extraction with an isopropanol/water mixture followed by one or more washes with water and, optionally, a steam distillation, to remove residual monomers. By this means polymers having molecular weights in the range 500 to 40,000 are obtained. The copolymer preferably contains 10 to 90 wt. % butene, preferably 20 to 80 wt. %, more preferably 25 to 50 wt. %.

Although the copolymer of the $C_5$ stream and butene may be used with both natural and synthetic rubbers it is particularly useful with certain synthetic rubbers, e.g. polyisoprene and, especially, styrene/isoprene copolymer rubbers. The latter are block copolymers containing more than 50 wt. % styrene and less than 50 wt. % isoprene. The rubber suitably contains 20 to 160 wt. % of the $C_5$ stream/butene resin, preferably 60 to 100 wt. %.

Other classes of synthetic rubbers which may be used in the compositions according to the present invention are the so-called EP and EPDM rubbers, i.e. copolymers of ethylene and propylene and copolymers of ethylene, propylene and a termonomer which is usually a non-conjugated diolefine.

The non-conjugated diolefine may be chosen from one of the following groups:

(a) Acyclic diolefins in which the double bonds are separated by more than 2 carbon atoms and in which at least one double bond is terminally located, e.g. 1,4-hexadiene and 1,6-octadiene, (b) Monocyclic dienes or alkyl substituted monocyclic dienes in which both double bonds are located in the ring and which preferably contain 6 to 12 carbon atoms, e.g. cyclo octadiene, (c) Alkenyl cycloalkenes preferably containing up to 12 carbon atoms, e.g. 4-vinyl cyclohexene, (d) Bicyclic dienes with condensed nuclei sharing two or more carbon atoms in which the two double bonds are located in different rings. Thus two carbon atoms may be shared as in an indene such as 4,7,8,9-tetrahydroindene or three carbon atoms may be shared as in 2-alkyl-norborna-2,5-dienes, in which the alkyl group may contain up to six carbon atoms.

(e) Bicyclic dienes substituted by an alkenyl group in which one double bond is located in one ring and the other double bond links the alkenyl group to a carbon atom in the other ring, e.g. 5-alkenylnorbornenes-2 containing up to 6 carbon atoms in the alkenyl group such as 5-methylene-2-norbornene and 5-ethylidine-2-norbornene, (f) Bicyclic dienes substituted by an alkenyl group in which one double bond is located in one ring and the other double bond is located internally in the alkenyl group, e.g. 5-alkenylnorbornenes-2 in which the alkenyl group contains up to 6 carbon atoms such as 5-(1-propenyl) norbornene-2, (g) Bicyclic dienes substituted by an alkenyl group in which one double bond is located in one ring and the other double bond is in a terminal position in the alkenyl chain, e.g. 5-alkenylnorbornenes-2 in which the alkenyl group contains up to 6 carbon atoms such as 5-isopropenylnorbornene-2.

(h) Polycyclic dienes containing three or more rings in which the double bonds are located in different rings, e.g. dicyclopentadiene or a cyclohexenorbornene, preferably in which the cyclohexene ring contains lower alkyl substituents on one or both of the doubly bonded carbon atoms such as 1,4-endomethylene-6-methyl-1,4,5,8,9,10-hexahydronaphthalene.

If desired two or more non-conjugated dienes may be used together.

The EP rubbers preferably contain 65 to 35 wt. % ethylene and 35 to 65 wt. % propylene while the EPDM rubbers preferably contain 65 to 35 wt. % ethylene, 35 to 65 wt. % propylene and 2 to 20 wt. % termonomer. The molecular weights of such polymers, suitably lie in the range 3,000 to 1,000,000.

The $C_5$ stream/butene resin may be compounded with the rubber by conventional means, e.g. by a Z-blade mixer, a Banbury mixer or by mixing in solution.

The invention will now be further described with reference to the following Examples:

EXAMPLE 1

The $C_5$ stream used was derived from a steam cracked naphtha and contained isoprene (16 weight %), cis- and trans-piperylene (10 weight %), n-pentane, isopentane, pentene-1, cyclopentadiene, dicyclopentadiene (total mono- and di-cyclopentadiene 21.5 weight %), trans-pentene-2, 2-methylbutene-1, 3-methylbutene-1, 2-methylbutene-2 (2.5 weight %), cyclopentene, cyclopentane and benzene. To this was added 30 wt. % butadiene raffinate of composition butene-1 (23 wt. %), isobutene (45 wt. %), trans-butene-2 (8 wt. %), cis-butene-2 (7 wt. %), butadiene (1.0 wt. %), the balance being butanes. The stream was then heated in a tubular reactor in which its residence time was 30 minutes, the temperature in the reactor varying over its length from 120° to 140° C. On leaving the reactor the stream was passed through a second, unheated reactor in which its residence time was 40 minutes.

The polymerisation was carried out at ambient temperature by treating the feedstock with a catalyst complex produced by dissolving aluminium chloride in cumene while bubbling hydrogen chloride through the liquid. Sufficient complex was added to provide 0.8% by weight of aluminium chloride based on the weight of hydrogen feedstock. Catalyst addition took place over a ½ hour period following which the catalyst was decomposed by the addition of ammoniacal aqueous isopropanol, the aluminium chloride being removed in the aqueous solution. The resin was finally water washed, dried, distilled to remove volatile impurities and vacuum distilled to remove heavy oils.

The resin produced by this process contained 30 wt. % butenes and had a softening point of 85° C. It was blended with a styrene/isoprene block copolymer (CARIFLEX TR1107; CARIFLEX is a trademark) by dissolving the rubber and resin in toluene. The tack properties of rubber/resin blend were then determined using the toluene solution in the following standard test methods.

180° Peel Adhesion: Pressure Sensitive Tape Committee Test (U.S. Standard) PSTC-No. 1. The test was carried out at a pulling rate of 12 inches/minute from stainless steel plates and measured in g per linear inch.

Tack: Rolling Ball Method—PSTV-6. Method results reported in centimeters.

Quick stick: In this method a loop of tape coated with the rubber/resin blend is held in the jaws of a tensile tester (INSTRON). The jaws of the tester are lowered until the tape falls under its own weight onto a stainless steel plate of 1 inch square cross section. The jaw movement is then reversed and a measurement made of the force required to peel the tape off the plate.

The results of testing the polymer/resin blend prepared as described above are represented in FIG. 1 in which the results are plotted in graphical form.

EXAMPLE 2

The $C_5$ stream used was derived from a steam cracked naphtha and contained isoprene (16 weight %), cis- and trans-piperylene (10 weight %), n-pentane, isopentane, pentene-1, cyclopentadiene, dicyclopentadiene (total mono- and di-cyclopentadiene 21.5 wieght %), trans-pentene-2, 2 -methyl-butene-1, 3-methylbutene-1, 2-methylbutene-2 (2.5 weight %), cyclopentene, cyclopentane and benzene. To this was added 30 wt. % butadiene raffinate of composition butene-1 (23 wt. %), isobutene (45 wt. %), trans-butene-2 (8 wt. %), cis-butene-2 (7 wt. %), butadiene (1.0 wt. %) the balance being butanes. The stream was then heated in a tubular reactor in which its residence time was 30 minutes, the temperature in the reactor varying over its length from 120° to 140° C. On leaving the reactor the stream was passed through a second, unheated reactor in which its residence time was 40 minutes.

The polymerisation was carried out at ambient temperature by treating the feedstock with a catalyst complex produced by dissolving aluminium chloride in cumene while bubbling hydrogen chloride through the liquid. Sufficient complex was added to provide 0.8% by weight of aluminium chloride based on the weight of hydrocarbon feedstock. Catalyst addition took place over a ½ hour period following which the catalyst was decomposed by the addition of ammoniacal aqueous isopropanol, the aluminium chloride being removed in the aqueous solution. Thd resin was finally water washed, dried, distilled to remove volatile impurities and vacuum distilled to remove heavy oils.

The resin produced by this process contained 30 wt. % butenes and had a softening point of 85° C. It was blended with an EPDM rubber (INTOLAN 140A, INTOLAN is a trademark) by dissolving the rubber and resin in toluene. The tack properties of the rubber/resin blend were then determined using the toluene solution by the test methods described in Example 1. The results were as follows:

| Parts resin (wt) per 100 parts rubber | Tack (cms) | 180° Peel Adhesion (grams per linear inch) | Quick Stick (grams |
|---|---|---|---|
| 20 | 19.1 | 200 | 30 |
| 40 | 8.4 | 475 | 90 |

-continued

| Parts resin (wt) per 100 parts rubber | Tack (cms) | 180° Peel Adhesion (grams per linear inch) | Quick Stick (grams) |
|---|---|---|---|
| 60 | 9.6 | 500 | 320 |
| 80 | 14.3 | 950 | 520 |
| 100 | 21.7 | 745 | 530 |
| 120 | 31.3 | 860 | 560 |
| 140 | >40 | 765 | 270 |
| 160 | >40 | 855 | 225 |

The resin and rubber were also made into a blend comprising:

| | | |
|---|---|---|
| INTOLAN 140 A | 100 | parts by weight |
| HAF Black | 40 | parts by weight |
| SUNPAR 2280 | 10 | parts by weight (plasticising oil) |
| Zinc oxide | 5 | parts by weight |
| Stearic acid | 1 | parts by weight |
| VULCAFOR MS | 1.5 | parts by weight |
| VULCAFOR MBTS | 0.5 | parts by weight Curing agents |
| Sulphur | 1.5 | parts by weight |

SUNPAR, and VULCAFOR are trade marks.

This composition was then evaluated in a Monsanto "Tel-Tak" instrument and by rheometer. The results are given below.

| Parts resin per 100 parts rubber (w/w) | Tack lbs/in² | Stick lbs/in² | Tensile (kg/cm²) | | | Tensile Strength kg/cm² | Elongation % | Shore A Hardness |
|---|---|---|---|---|---|---|---|---|
| | | | 100% | 200% | 300% | | | |
| 0 | 15 | 17 | 14 | 53 | — | 98 | 290 | 74 |
| 10 | 26 | 39 | 5 | 25 | 59 | 156 | 480 | 73 |
| 20 | 31 | 42 | 6 | 16 | 32 | 177 | 670 | 71 |

| Parts resin per 100 parts rubber (w/w) | RHEOMETER CURES | | | |
|---|---|---|---|---|
| | Minimum | Maximum | 90 mins | 95 mins |
| 0 | 11.9 | 94 | 13 | 17 |
| 10 | 10.3 | 71.7 | 12 | 16 |
| 20 | 12.5 | 47.5 | 13 | 16 |

EXAMPLE 3

Example 2 was repeated but the INTOLAN 140A was replaced by INTOLAN 170A. The results obtained were as follows:

| Parts resin per 100 parts rubber (w/w) | Tack (cms) | 180° Peel Adhesion (grams per linear inch) | Quick Stick (grams) |
|---|---|---|---|
| 20 | 24 | 50 | — |
| 40 | 24.2 | 595 | 245 |
| 60 | 12.2 | 585 | 330 |
| 80 | 9.6 | 635 | 330 |
| 100 | 12.2 | 675 | 680 |
| 120 | 36.8 | 735 | 340 |
| 140 | >40 | 1050 | 550 |
| 160 | >40 | 940 | 265 |

| Parts resin per 100 parts rubber (w/w) | Tack lbs/in² | Stick lbs/in² | Tensile (kg/cm²) | | | Tensile Strength Kg/cm² | Elongation % | Shore A Hardness |
|---|---|---|---|---|---|---|---|---|
| | | | 100% | 200% | 300% | | | |
| 0 | 13 | 19 | 30 | 86 | — | 108 | 240 | 77 |
| 10 | 14 | 19 | 17 | 52 | 91 | 172 | 420 | 75 |
| 20 | 27 | 36 | 14 | 34 | 66 | 203 | 530 | 73 |

| Parts resin per 100 parts rubber (w/w) | RHEOMETER CURES | | | |
|---|---|---|---|---|
| | Minimum | Maximum | 90 mins | 95 mins |
| 0 | 23.6 | 124.8 | 15 | 21 |
| 10 | 19.2 | 99 | 12 | 18 |
| 20 | 16.2 | 82.2 | 10 | 12 |

INTOLAN 140A and INTOLAN 170A are both terpolymers of ethylene, propylene and 5-ethylidene-2-norbornene in which INTOLAN 140A has a lower molecular weight (40 Mooney) than INTOLAN 170A (70 Mooney).

I claim:

1. A composition comprising a rubber and a resin wherein the resin has been produced by the copolymerization of a $C_5$ hydrocarbon stream and a butene, wherein said $C_5$ hydrocarbon stream contains dicyclopentadiene or a codimer of cyclopentadiene with a diene selected from the group consisting of butadiene, isoprene and piperylene, wherein the amount of said dicyclopentadiene or said codimer is at least 10% by weight of the total weight of said $C_5$ hydrocarbon stream and said butene; wherein said $C_5$ hydrocarbon stream contains not more than 10% by weight of 2-methylbutene-2; and wherein said resin has a molecular weight of 500 to 40,000 and contains 10% to 90% by weight butene.

2. A composition according to claim 1 in which the butene is isobutene.

3. A composition according to claim 1 in which the resin is produced by the copolymerisation of a $C_5$ hydrocarbon stream and a mixture of butenes.

4. A composition according to claim 1 in which the $C_5$ stream and the butene are copolymerised by means of a Friedel Crafts catalyst.

5. A composition according to claim 1 in which the resin contains 10 to 90 wt. % butene.

6. A composition according to claim 1 in which the rubber is a synthetic rubber.

7. A composition according to claim 6 in which the rubber is polyisoprene, a styrene/isoprene copolymer, or copolymers of ethylene and propylene or copolymers of ethylene, propylene and a termonomer.

8. A composition according to claim 7, wherein said termonomer is an acrylic diolefin in which the double bonds are separated by more than two carbon atoms and in which at least one double bond is terminally located; monocyclic dienes or alkyl substituted monocyclic dienes in which both double bonds are located in the ring and which contain 6 to 12 carbon atoms; alkenyl cycloalkenes containing up to 12 carbon atoms; bicyclic dienes with condensed nuclei sharing two or more carbon atoms in which the double bonds are located in different rings; bicyclic dienes substituted by an alkenyl group in which one double bond is located in one ring and the other double bond links the alkenyl group to a carbon atom in the other ring; bicyclic dienes substituted by an alkenyl group in which one double bond is located in one ring and the other double bond is located internally in the alkenyl group; bicyclic dienes substituted by an alkenyl group in which one double bond is located in one ring and the other double bond is in a terminal position in the alkenyl chain; or polycyclic dienes containing three or more rings in which the double bonds are located in different rings.

9. A composition according to claim 1 comprising a styrene/isoprene copolymer and 20 to 160% by wt. based on the copolymer of a resin of molecular weight 500 to 40,000 which has been produced by the copolymerisation of a $C_5$ hydrocarbon stream containing at least 10% of dicyclopentadiene or a codimer of cyclopentadiene with a diene selected from the group consisting of butadiene, isoprene and piperylene and not more than 10% by weight 2-methylbutene-2 with a butene said resin containing 25 to 50 wt. % butene.

10. A composition according to claim 1, wherein said resin consists essentially of the copolymerization product of said $C_5$ hydrocarbon stream and said butene.

* * * * *